United States Patent
Ghaffari et al.

(10) Patent No.: US 6,829,663 B1
(45) Date of Patent: Dec. 7, 2004

(54) METHOD AND APPARATUS FOR THE SYNCHRONOUS CONTROL OF A SERIAL INTERFACE

(75) Inventors: Bahareh Ghaffari, Boulder, CO (US); Jeffrey F. Stone, Fort Collins, CO (US)

(73) Assignee: Adaptec, Inc., Milpitas, CA (US)

( * ) Notice: Subject to any disclaimer, the term of this patent is extended or adjusted under 35 U.S.C. 154(b) by 120 days.

(21) Appl. No.: 10/225,905

(22) Filed: Aug. 21, 2002

(51) Int. Cl.[7] .............................................. G06F 13/12
(52) U.S. Cl. ......................................... 710/71; 710/65
(58) Field of Search .............................. 710/71, 66, 65, 710/306; 209/318

(56) References Cited

U.S. PATENT DOCUMENTS

| | | | |
|---|---|---|---|
| 5,596,724 A * | 1/1997 | Mullins et al. ................ 710/71 |
| 5,625,800 A | 4/1997 | Brayton et al. .............. 395/500 |
| 5,655,147 A | 8/1997 | Stuber et al. ................ 395/827 |
| 5,784,390 A | 7/1998 | Masiewicz et al. ....... 371/40.11 |
| 5,812,877 A | 9/1998 | Young ......................... 395/844 |
| 5,838,950 A | 11/1998 | Young et al. ................ 395/500 |
| 5,923,896 A | 7/1999 | Young ......................... 395/825 |
| 6,006,292 A | 12/1999 | Young ........................... 710/39 |
| 6,012,107 A | 1/2000 | Young ........................... 710/39 |
| 6,088,742 A | 7/2000 | Sim .............................. 710/52 |
| 6,122,683 A * | 9/2000 | Ku et al. ....................... 710/71 |
| 6,157,964 A | 12/2000 | Young ............................ 710/5 |
| 6,173,342 B1 | 1/2001 | Tsunoda et al. ............... 710/8 |
| 6,192,492 B1 | 2/2001 | Masiewicz et al. ........... 714/56 |
| 6,199,122 B1 | 3/2001 | Kobayashi ................... 710/36 |
| 6,243,767 B1 | 6/2001 | Young ............................ 710/3 |
| 6,253,272 B1 | 6/2001 | Young ........................ 710/129 |
| 6,256,687 B1 * | 7/2001 | Ellis et al. .................... 710/71 |
| 6,587,942 B1 * | 7/2003 | Chiang ....................... 713/100 |

* cited by examiner

Primary Examiner—Kim Huynh
(74) Attorney, Agent, or Firm—Sheridan Ross P.C.

(57) ABSTRACT

The present invention is directed to the synchronous control of a parallel interface. In particular, the present invention provides an interface between a serial communication link and parallel communication channels within an adapter that operate synchronously, and without requiring a data buffer. A data buffer may be provided between the parallel data channels of the adapter that operate synchronously with the serial data channel, and the adapter's host interface. The present application reduces the amount of memory that must be provided by the adapter, and eliminates delays caused by the provision of additional data buffers.

24 Claims, 5 Drawing Sheets

METHOD AND APPARATUS FOR THE SYNCHRONOUS CONTROL OF A SERIAL INTERFACE

FIELD OF THE INVENTION

The present invention relates to computer communication channels. In particular, the present invention relates to the synchronous control of a serial interface and to the maintenance of high data transfer rates between parallel and serial communication channels.

BACKGROUND OF THE INVENTION

Communication protocols provide standards by which commands and data may be passed between various components associated with a computer system. In addition to establishing the standards for physical connections between devices, protocols establish the commands that can be transmitted, and they established the packaging and flow of data passed over the bus used in connection with the protocol.

Communications channels can be categorized as belonging to either of two methods for transferring commands and data. In one arrangement, a parallel communication scheme or protocol is used. A parallel protocol utilizes multiple signal lines for providing signals related to control of the bus, and multiple signal lines for transferring data between a bus controller and devices interconnected to the bus. Contrasted with parallel communication channels are serial channels. According to a serial communication scheme or protocol, device control signals, commands and data are transmitted in series along a single signal line.

At the interface between communication channels or busses, adapters may be used to translate from the protocol used by the first bus to the protocol used by the second bus. In order to accommodate differences in the amount of data provided to the adapter by one of the channels and the amount of data that can be received by the other of the channels, adapters commonly incorporate first-in first-out (FIFO) buffers at the interface between the first communication channel and the adapter, and at the interface between the second communication channel and the adapter. That is, the adapter provides memory in which data may be stored temporarily to accommodate different data transfer rates. The use of a FIFO buffer at the interface between the adapter and each of the channels also allows variations in the amount of time required by the adapter to, for example, perform error checking functions, to be accommodated. However, the use of buffers at the interface between both the first communication channel and the adapter and the second communication channel and the adapter introduces delays in the transfer of data between the first and second channels. In addition, the management of multiple buffers complicates the operation of the adapter, and adds to the processing overhead of the adapter.

Therefore, it would be desirable to provide for an adapter capable of interfacing a parallel communication channel to a serial communication channel that did not require the use of multiple data buffers. Furthermore, it would be advantageous to interface a parallel communication channel to a serial communication channel such that the conversion between the serial and the parallel protocols was performed without introducing variable delays. In addition, it would be advantageous to provide an adapter for interfacing parallel communication channel to a serial communication channel that was reliable in operation and inexpensive to implement.

SUMMARY OF THE INVENTION

In accordance with the present invention, a method and an apparatus for interfacing a serial communication channel to a parallel communication channel are provided. The present invention generally provides an adapter for providing such an interface that does not require the use of a first-in first-out (FIFO) buffer in connection with the link layer that is in communication through the physical layer with a device utilizing a serial communications protocol. In particular, the need for such a buffer is removed by synchronously controlling the operation of the serial interface. Accordingly, the present invention provides an interface that is capable of decreasing delays in transferring data as compared to a conventional adapter. In addition, the processing overhead associated with control of a buffer associated with the link is eliminated by eliminating a FIFO buffer in the link or at the interface between the transport and the link. Furthermore, the need to provide space for a FIFO buffer between the link layer and the host interface is eliminated.

In accordance with an embodiment of the present invention, an adapter comprising a host interface, transport, link, and physical layers is provided. In connection with the host interface, a FIFO buffer is provided for synchronizing the transfer of data between a host bus and the adapter. The link layer is interconnected to a device utilizing a serial communication protocol through the physical layer. No FIFO buffer is provided in connection with the link layer. Accordingly, the operation of the transport, link, and physical layers are coordinated or synchronized. As a result, delays encountered in passing data between the parallel communication bus and the serial communication bus is limited. In particular, the time for a frame of data of a first length to pass between the FIFO associated with the transport and the device is predetermined. In accordance with an embodiment of the present invention, the transport layer controls the passage of data between the various layers of the adapter.

In accordance with another embodiment of the present invention, a method is provided for synchronous control of a serial interface. According to the method, a data frame of a first length is passed from the FIFO of the host interface to the device in a first number of clock cycles. Accordingly, the serial communications channel is capable of transferring a data frame of a first length across the serial channel in a first number of clock cycles. A parallel data channel within the adapter, having an operating frequency different from the operating frequency of the serial data channel and interconnecting the link to the host interface, is capable of transferring a data frame of the first length across the parallel data channel in a second number of clock cycles. According to the method, the ratio of the number of clock cycles required for the serial data channel to pass a frame of a given length to the number of clock cycles required for the internal parallel channel to pass the same frame is fixed. Because the ratio of the number of clock cycles required for the adapter to transfer a frame of data between the interface with the serial communication channel and the FIFO of the interface with the parallel communication channel is fixed, there is no need to provide a FIFO buffer in connection with the transport layer. Accordingly, delays in transferring data that might occur as a result of that data being held in a buffer in the transport layer are removed. In addition, overhead associated with the control of a FIFO at the serial communication channel side of the adapter is avoided.

Additional advantages of the present invention will become readily apparent from the following discussion, particularly when taken together with the accompanying drawings.

DETAILED DESCRIPTION

The present invention relates to the synchronous control of a serial computer interface.

Figure 1:
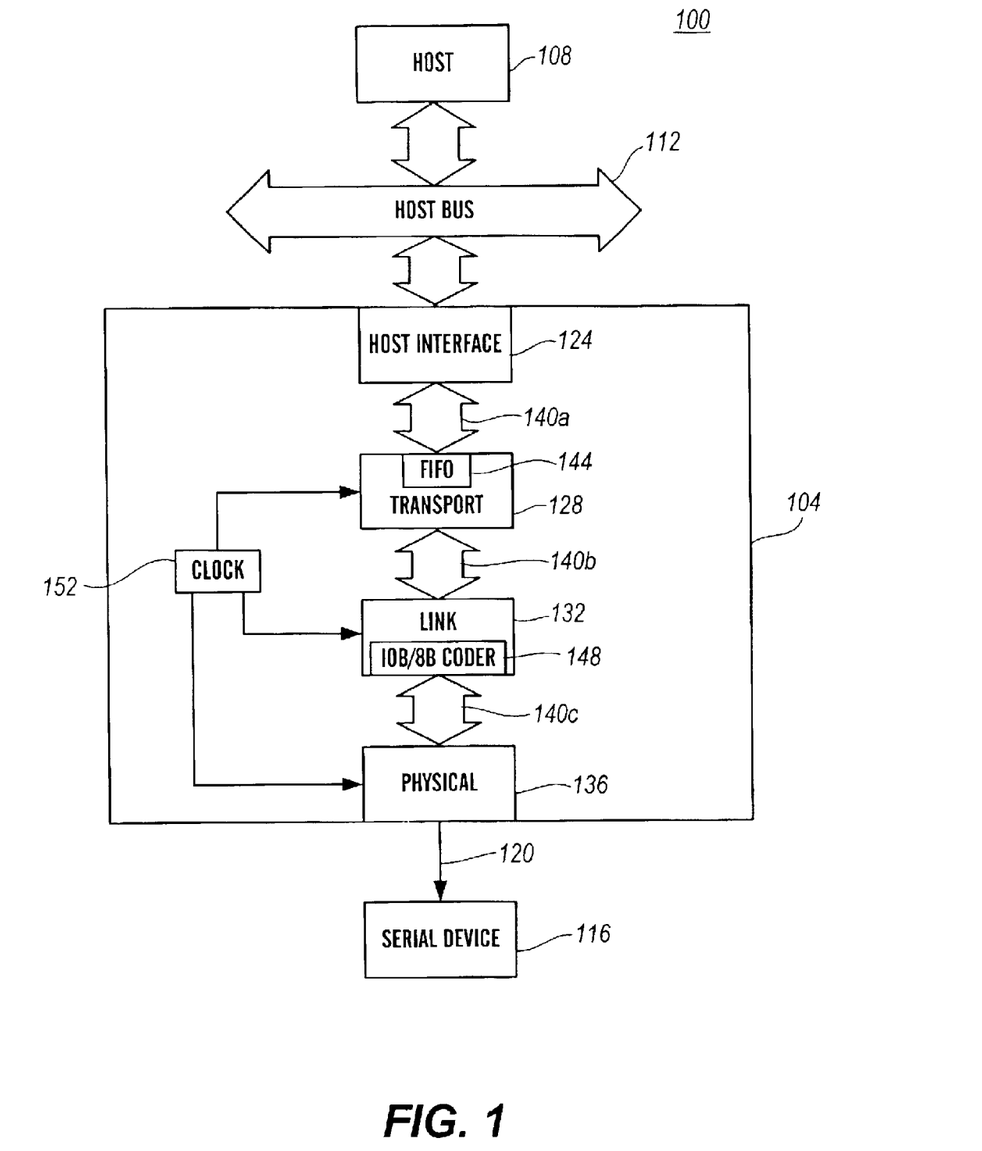
FIG. 1 is a block diagram depicting various operating layers of an adapter interconnected to a computer system in accordance with an embodiment of the present invention.

With reference now to FIG. 1, a computer system 100 utilizing an adapter 104 in accordance with an embodiment of the present invention is illustrated. In addition to the adapter 104, the computer system 100 generally includes a host computer 108, a host bus 112, a serial device 116, and a serial communication link 120. In general, the adapter 104 interconnects the serial device 116 to the host 108 and in particular the host bus 112. Furthermore, the adapter 104 converts the serial data stream received from the serial device 116 over the serial communication link 120 into a parallel data stream that is provided to the host 108 over the host bus 112.

The host 108 may include any type of computer system. For example, the host 108 may include a Pentium™ processor based computer. The host bus 112 may comprise any communication bus utilized for interconnecting a host computer (e.g., host 108) to peripheral devices (e.g., serial device 116). For example, the host bus 112 may comprise a Peripheral Component Interface (PCI) bus. The serial device 116 may include any device that communicates over a serial communication link, such as serial communication link 120. Accordingly, the serial device 116 may include storage devices, such as hard disk drives, tape drives, optical storage devices, or solid state storage devices, including removable solid state storage devices, that utilize a serial communication protocol, such as the serial advanced technology attachment (SATA) protocol. Further, it should be appreciated that the serial device 116 is not limited to storage devices, and can include devices such as input or output devices, and communication links to other computers.

As noted above, the adapter 104 interconnects the serial device 116 to the host 108. Furthermore, the host 108 is generally interconnected to the adapter 104 by a parallel communication bus 112. The adapter 104 is interconnected to the serial device 116 by the serial communication link 120. Accordingly, the adapter 104 must translate between the parallel communication format used on the host bus 112 and the serial communication format used on the serial communication link 120. However, this is not a simple serial to parallel conversion. In particular, the host bus 112 having an adapter 104 and a serial device 116 interconnected thereto in accordance with the present invention will also have other devices that utilize the host bus 112 for communications. Accordingly, the data transmission capacity of the host bus 112 will vary. As a result, the adapter 104 must be capable of buffering data transmitted between the adapter 104 and the host 108 over the host bus 112 (or between the adapter 104 and another host or device interconnected to the host bus 112).

The adapter 104 generally comprises a host interface 124, a transport layer 128, a link layer 132, and a physical layer 136. In general, the host interface 124 and the various layers 128–136 of the adapter 104 are interconnected to one another by parallel data channels 140. These parallel data channels 140 may have different channel widths and operating frequencies. For example, the parallel channel 140a interconnecting the host interface 124 to the transport 128 is, in accordance with an embodiment of the present invention, 128 bits wide and operates at a frequency of 75 MHZ. This width and operating frequency is useful in connection with a typical host bus 112, such as a PCI or PCI-X host bus, which have channel widths of up to 64 bits and operating frequencies of up to 133 MHZ. That is, the greater capacity of the parallel data channel 140a between the host interface 124 and the transport layer 128 provides a pipeline that is large enough to receive data from the host bus 112 without interposing delays in the transmission of data.

Continuing the present example, the parallel data channel 140b interconnected the transport layer 128 to the link layer 132 may by 32 bits wide and have an operating frequency of 37.5 MHZ, to provide a data rate of 150 MB/s. This channel width and operating frequency may be selected to match the internal channel width and operating frequency of the transport layer 128. It will be noted that the data transfer rate of 1 GB/s provided by the parallel data channel 140a between the host interface 124 and the transport layer 128 is greater than the 150 MB/s data rate provided by the parallel data channel 140b interconnected the transport layer 128 to the link layer 132. In order to accommodate these differing data transfer rates, and also to accommodate variations in the actual data rate available on the host bus 112, a data buffer (also referred to herein as transport-host interface buffer or first in first out buffer) 144 is provided as part of the transport layer 148. In particular, the data buffer 144 buffers data passed between the host interface 124 and the transport layer 128 by providing temporary data storage space to accommodate differences in the data transfer rate of the transport layer 128 and the transfer rates available on the host bus 112 during a transmission of data. For example, in accordance with an embodiment of the present invention, about one kilobyte of storage space is provided by the data buffer 144.

A clock 152 may be included as part of the adapter 104 to provide a synchronized timing signal to the layers 128–136. The signal from the clock may be multiplied or divided by the various layers 128–136 as required.

Continuing the present example, the parallel data channel 140c interconnecting the link layer 132 to the physical layer 136 may have a channel width of 10 bits and an operating frequency of 150 MHZ, for a data transfer rate of 150 MB/s, where each byte is encoded using 10 bits (i.e. is 10 B/8 B encoded). Accordingly, the parallel data channel 140c interconnecting the link layer 132 to the physical layer 136 provides a data rate that matches the parallel data channel 140b interconnecting the transport layer 128 to the link layer 132, after accounting for the 10 B/8 B encoding (and decoding) performed in a 10 B/8 B coder 148 provided as part of the link layer 132.

The physical layer 136 interconnects the adapter 124 to the serial device 116 over the serial link 120. In accordance with an embodiment of the present invention, the serial link 120 comprises a serial advanced technology attachment (SATA) serial link operating at a frequency of 1.5 GHz to provide a data rate of 150 MB/s (with each byte encoded as a 10 bit data word).

As can be appreciated from the present example, although different channel widths and frequencies may be selected, the data rates available on the parallel data channel 140b interconnecting the transport layer 128 to the link layer 132, the parallel data channel 140c interconnecting the link layer 132 to the physical layer 136, and the serial communication link 120 interconnecting the physical layer 136 to the serial device 116 are matched. Accordingly, there is no need, nor is there provision for, a data buffer between the serial device 116 and the transport layer 128 of the adapter 104 in accordance with embodiments of the present invention. In particular, the provision of matched data rates allows the transport layer 128, the link layer 132, the physical layer 136, and the serial device 116 to be synchronized to one another in transferring data between the adapter 104 and the serial device 116. In addition, by eliminating a buffer between the transport layer 128 and the serial device 116, the adapter 104 can occupy less area than a conventional adapter utilizing a data buffer between the transport layer 128 and the serial device 116 that is otherwise similar to an adapter 104 in accordance with the present invention. Furthermore, by eliminating a buffer between the transport layer 128 and the serial device 116, the pipeline delay encountered in connection with the transfer of data between the transport layer 128 and the serial device 116 is a constant value. In addition, the pipeline delay between the transport layer 128 and the serial device 116 of an adapter 104 in accordance with the present invention is generally less than would be encountered in a conventional adapter because there is no need to pass data through such a buffer. The processing overhead associated with operation of an adapter 104 in accordance with the present invention is also generally less than a conventional adapter because there is no need to control the operation of a buffer between the transport layer 128 and the serial device 116.

In order to achieve the synchronous operation of the transport layer 128, the link layer 132, and the physical layer 136, with the transfer of data over the serial communication link 120 between the adapter 104 and the serial device 116, each of the aforementioned layers 128–136 must be capable of receiving data presented to the physical layer 136 by the serial device 116 over the serial communication link 120. In particular, the transport layer 128, the link layer 132, and the physical layer 136 must be capable of receiving any data presented by the serial device 116, at least up to an amount equal to the system's receive latency size. The receive latency size is defined to be the amount of data that is sent from the serial device 116 over the serial communication link 120 between the time at which the adapter 104, and in particular the transport layer 128, determines that the receipt of data must be stopped and the time that the serial device 116 is able to stop the transmission of data. Accordingly, this latency period includes the time required to send the signal to the serial device 116 requesting that the transmission be stopped, and the time required for the serial device 116 to act on the command. In general, because there is no buffer provided between the transport layer 128 and the serial communication link 120, and because the pipeline delay between the transport layer 128 and the physical layer 136 is a constant, the receive latency size is a function of the available data capacity in the data buffer 144 between the host interface layer 124 and the transport layer 128. Accordingly, the adapter 104 may signal the serial device 116 to stop the transmission of data when a "high water mark" is reached in the data buffer 144.

In addition, the transfer of data between layers 128–136 of the adapter 104 and the internal operation of those layers are synchronized to a common clock.

Figure 2:
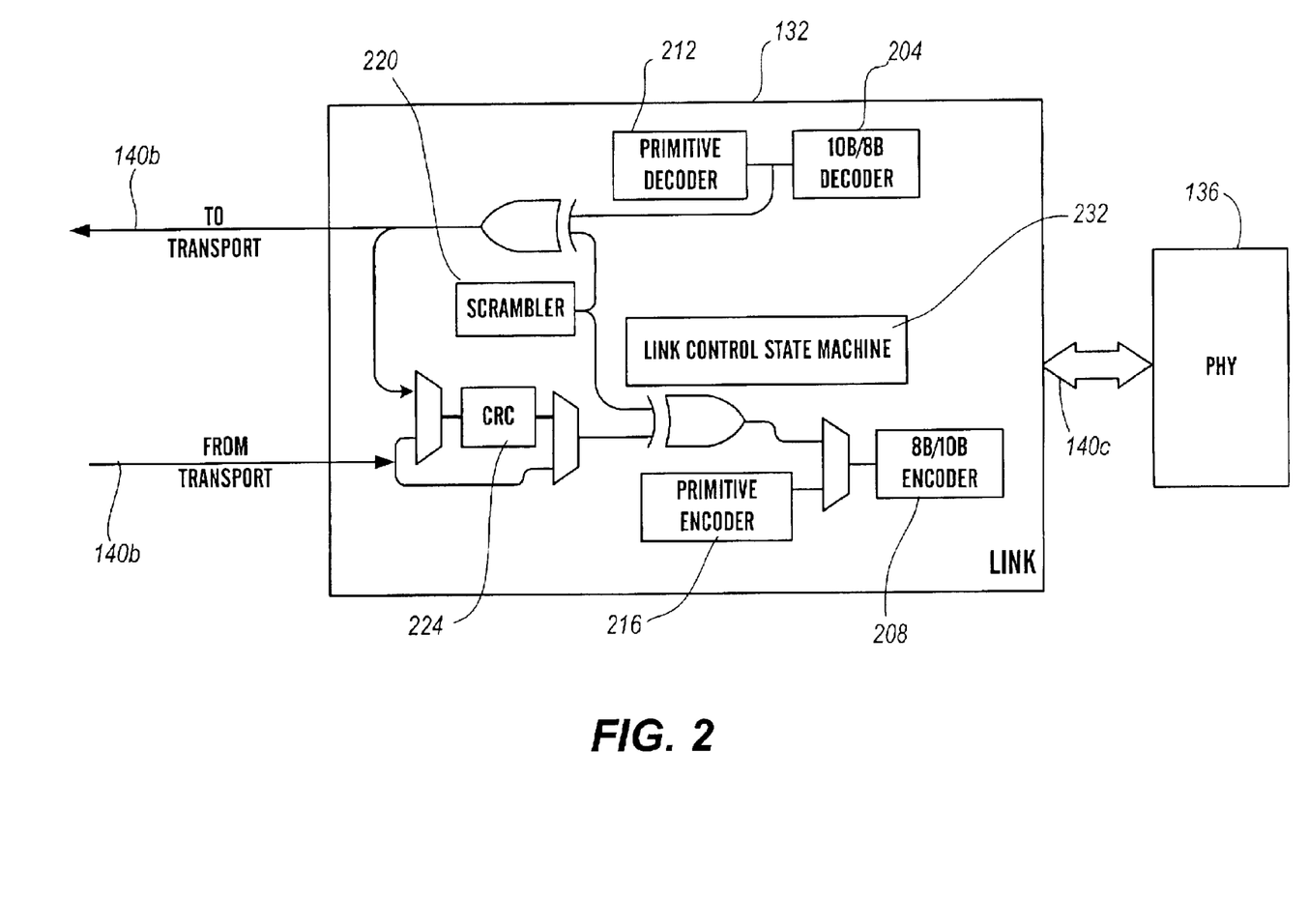
FIG. 2 is a block diagram of a link layer of an adapter in accordance with an embodiment of the present invention.

With reference now to FIG. 2, certain aspects of the link layer 132 and the physical layer 136 are shown in block diagram form. In general, frames of data are passed between the link layer 132 and the physical layer 136, and between the physical layer 136 and the serial device 116, as 10 B/8 B encoded data. Accordingly, the link layer 132 includes a 10 B/8 B decoder 204 and a 8 B/10 B encoder 208. In addition to performing 10 B/8 B coding functions, the link layer 132 performs primitive coding functions. Accordingly, the link layer 132 is provided with a primitive decoder 212 and a primitive encoder 216. A scrambler 220 is provided to implement a scrambling algorithm in connection with the communication protocol used between the adapter 104 and the serial device 116. A cyclical redundancy check block 224 is provided to detect problems in the transmission of data. Continuing the example given above, the transport 128 and link 132 may both operate at a frequency of 150 MHZ. In an embodiment of the present invention suitable for use with a 3.0 GHz serial link 120, the transport 128 may operate at a frequency of 150 MHZ and the link 132 may operate at a frequency of 300 MHZ. A link control state machine 232 is provided for controlling the operation of the link layer 132.

Figure 3:
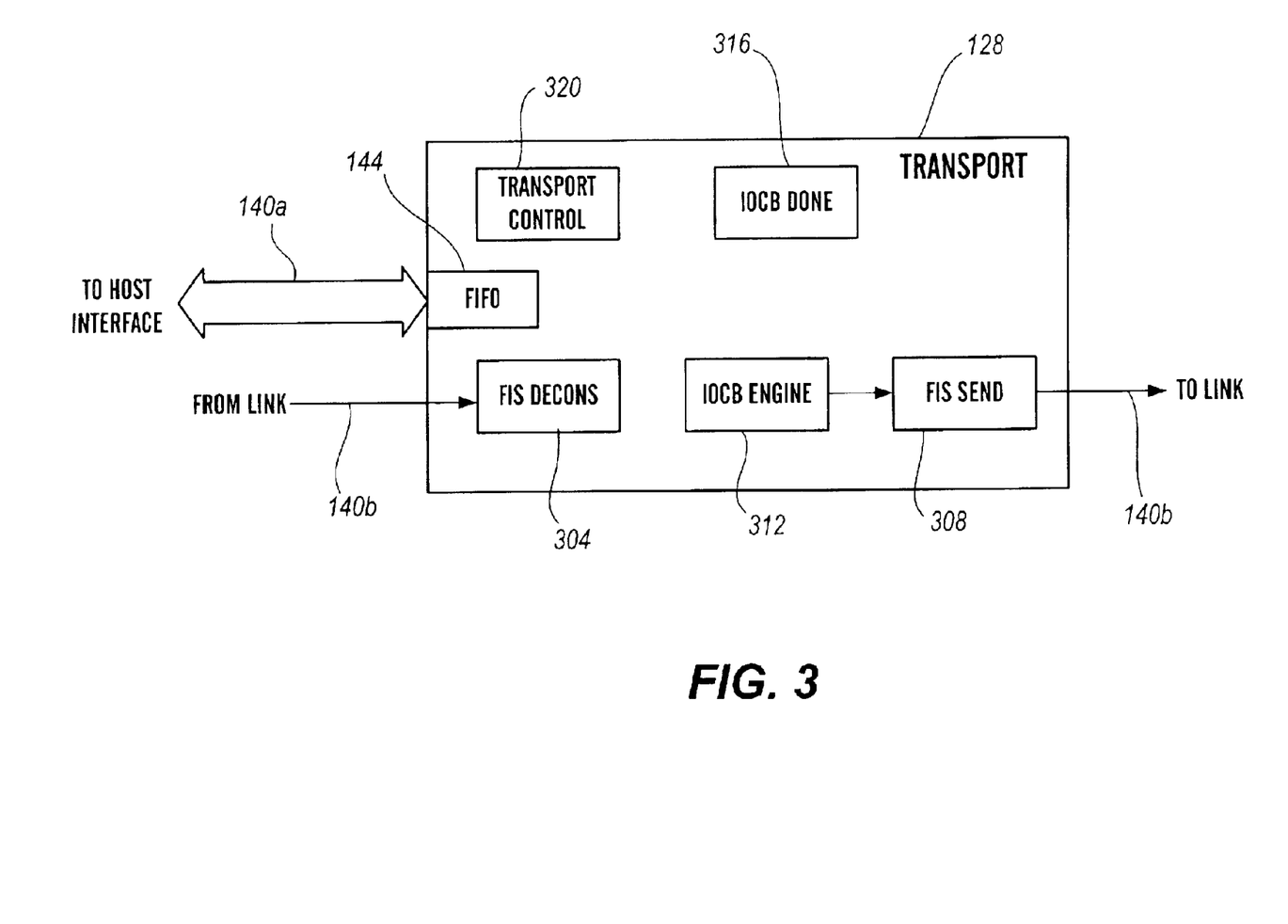
FIG. 3 is a block diagram of a transport layer of an adapter in accordance with an embodiment of the present invention.

With reference now to FIG. 3, aspects of the transport layer 128 are shown in block diagram form. In general, the transport layer 128 comprises a frame information structure decomposition block 304, a frame information structure send block 308, I/O command block engine 312, and I/O command block done engine 316. As noted above, the transport layer 128 also includes a first in/first out data buffer 144 at the interface between the transport layer 128 and the parallel data channel 140a interconnecting the transport layer 128 to the host interface 124. The transport control block 320 controls the operation of the various components and functions of the transport layer 128.

Figure 4:
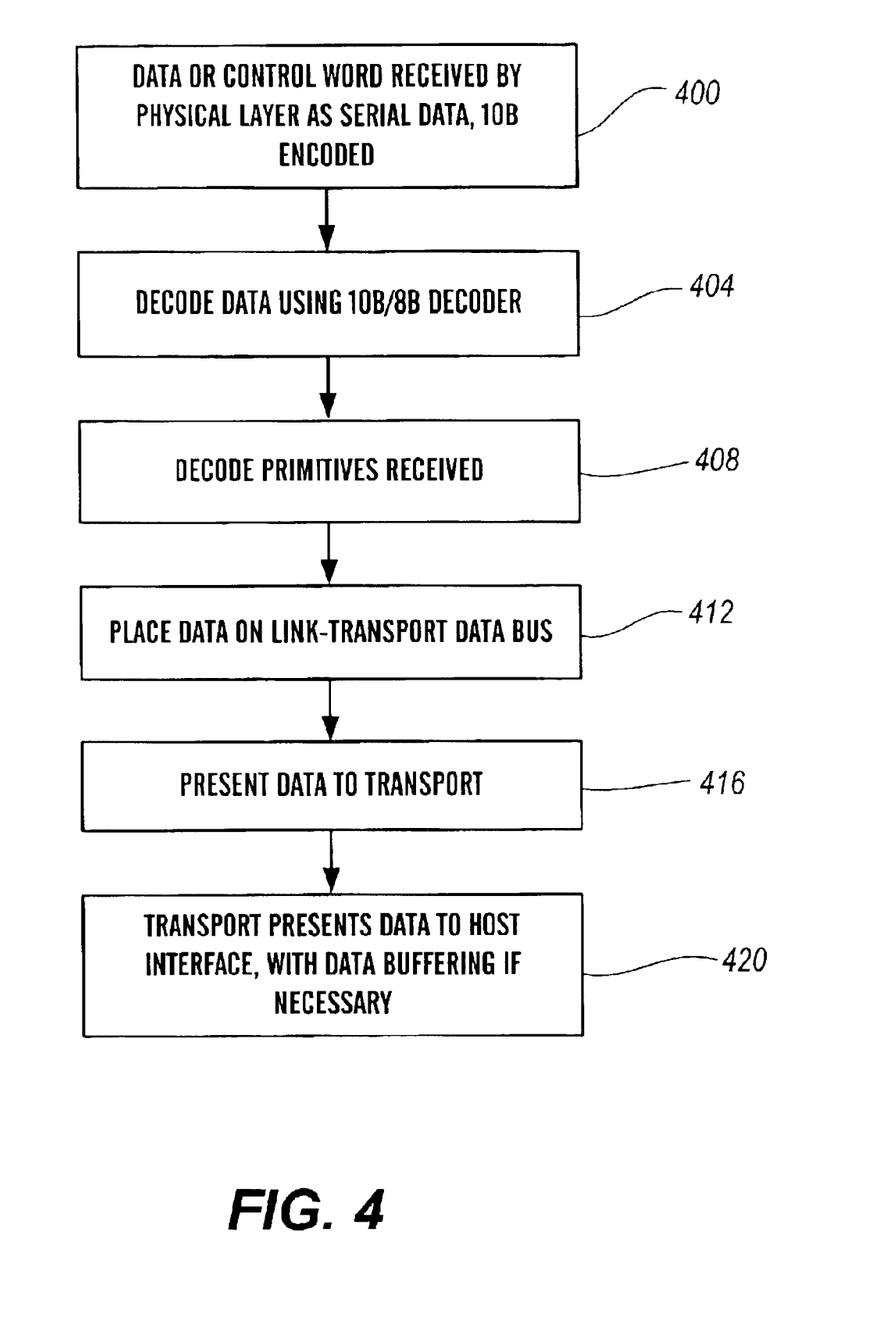
FIG. 4 is a flow chart illustrating the steps taken in connection with the flow of data through an adapter in accordance with an embodiment of the present invention.

With reference now to FIG. 4, an overview of the steps taken in connection with the flow of data through an adapter 104 in accordance with an embodiment of the present invention are illustrated. In general, at step 400, data or a control word is received by the physical layer 136 as a serial data signal from the serial communication link 120. In accordance with an embodiment of the present invention, the data is 10 B encoded (i.e. an 8 bit byte is encoded using 10 bits to form a data word (dword)). At step 404, the data received is decoded using the 10 B/8 B decoder provided as part of the link layer. At step 408, primitives received are decoded using the primitive decoder 312.

At step 412, the data is placed on the link transport data bus (i.e. the parallel data channel 140b interconnecting the link layer and the transport layer). Data is then presented to the transport (step 416). The transport then provides the data to the host interface 124, with data buffering if necessary (step 420).

From the description given above, it can be appreciated that data is received from the serial communication link 120 and passed through to the transport layer 128, without any buffering of that data. Accordingly, the pipeline delay from the interface with the serial data link 120, through the physical layer 136 and the link layer 132, up to the data buffer 144 provided at the interface between the transport layer 128 and the host interface layer 124, is constant. Furthermore, there is no possibility of variable delays, as there is no provision for data buffering, except for the data buffer 144 at the interface between the transport layer 128 and host interface 124.

Figure 5:
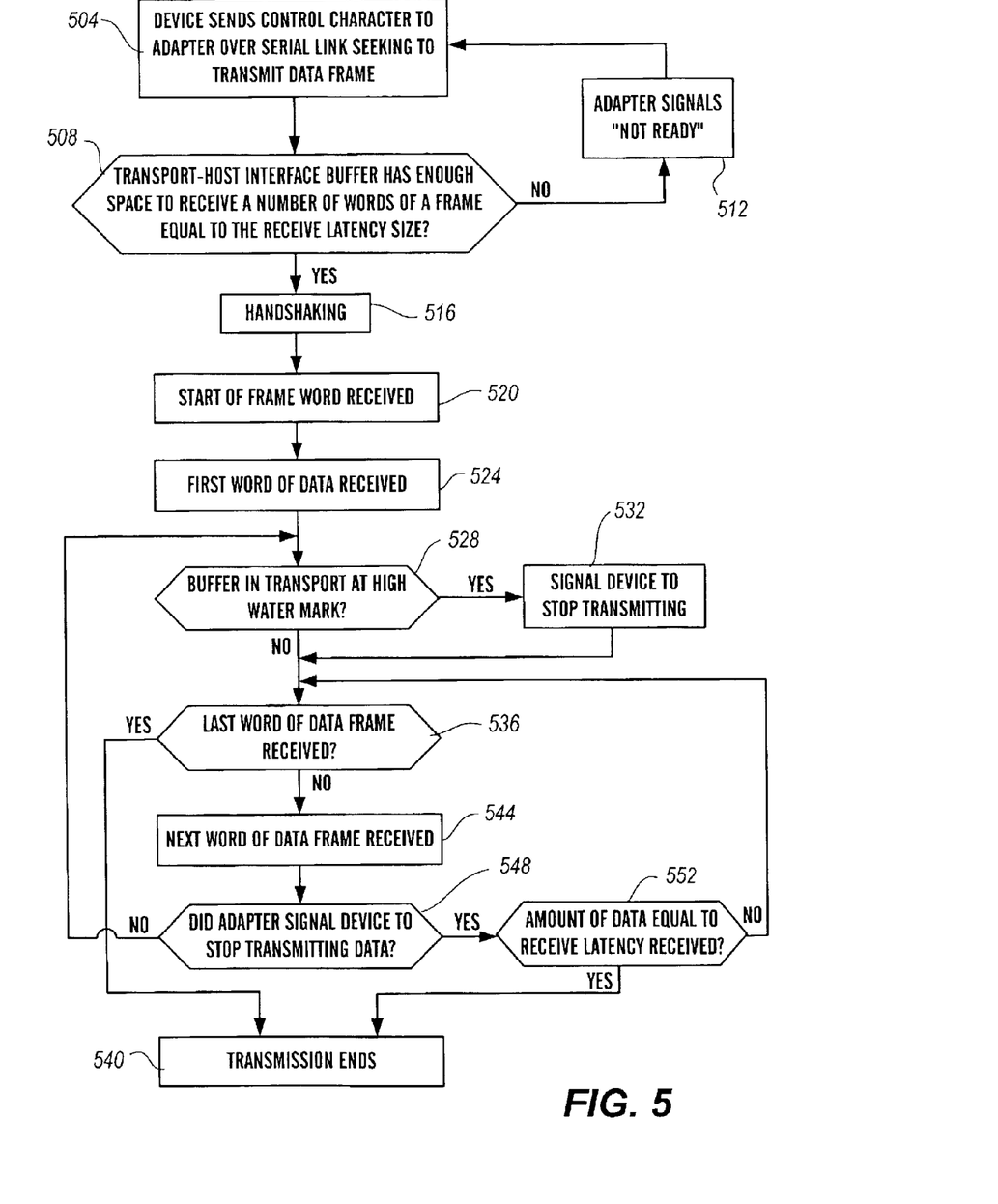
FIG. 5 is a flow chart illustrating the operation of an adapter receiving data from a serial device in accordance with an embodiment of the present invention.

With reference now to FIG. 5, a flow chart depicting the operation of an adapter 104 in accordance with an embodiment of the present invention in connection with receiving data from a serial device 116 is illustrated. Initially, at step 500, the serial device 116 sends a control character to the adapter 104 over the serial communication link 120, seeking to transmit a data frame. At step 504, a determination is made as to whether the data buffer (or transport-host interface buffer) 144 has enough space to receive a number of words of a frame equal to the receive latency size of the system 100. As noted above, the receive latency size corresponds to an amount of data that is passed from a serial device 116 to the adapter 104 after a stop transmission command has been issued by the adapter 104. In particular, the receive latency size is a function of the number of clock cycles that elapse before a stop transmission signal can be generated by the adapter 104, provided to the serial device 116, and acted upon by the serial device 116. If the transport-host interface buffer 144 is not capable of receiving a number of words equal to the receive latency size, the adapter 104 signals that it is not ready to receive data (step 512). The adapter then returns to step 504.

If the transport-host interface buffer 144 does have enough room to receive a number of words of a frame equal to the receive latency size, handshaking procedures may be completed (step 516). Next, a start of frame word is received (step 520) followed by the first word of data (step 524).

At step 528, a determination is made as to whether the transport-host buffer 144 is at a high water mark (step 528). In general, the high water mark corresponds to the receive latency size. If the buffer 144 is at the high water mark, the device 116 is signaled to stop transmitting (step 532). The adapter may then continue to step 536.

If the buffer 144 is not at the high water mark, or after the device 116 has been signaled to stop transmitting at step 532, a determination is made as to whether the last word of the data frame being transmitted has been received (step 536). If the last word of data within the data frame has been received, the transmission ends (step 540).

If the last word of data within the data frame has not been received, the next word of data within the data frame is received (step 544). Next, at step 548, a determination is made as to whether the adapter 104 has signaled the serial device 116 to stop transmitting data. If the adapter 104 has signaled the serial device 116 to stop transmitting data, a determination is made as to whether an amount of data received is equal to the receive latency size (step 552). If the adapter 104 has not signaled the serial device 116 to stop transmitting data, the system returns to step 528. The system returns to step 536 if at step 552 it is determined that the amount of data that has been received since the signal to stop transmitting data was issued is equal the receive latency size (i.e. no more data will be received until a sign to recommence the transmission of data is sent to the device 116 by the adapter 104). If the amount of data received since the stop transmission signal was sent is equal to the receive latency size, the transmission will end (step 540).

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for synchronously controlling a serial interface, comprising:

generating a clock signal;

receiving at a physical layer a serial data signal comprising a data frame including a first number of data bits;

converting said serial data signal to a parallel data signal;

providing said parallel data signal to a transport layer, wherein a pipeline delay between said physical layer and said transport layer is a predetermined number of cycles of said clock signal;

generating in a transport layer a stop signal; and after generating said stop signal, receiving at said transport layer a number of bits corresponding to a receive latency size.

2. The method of claim 1, wherein said predetermined number of clock signals comprises an integer number of clock signals.

3. The method of claim 1, wherein said data frame is received from a first source.

4. The method of claim 3, wherein data included in said data frame is not buffered between said physical layer and said transport layer.

5. The method of claim 1, wherein said predetermined number of cycles of said clock signal is equal to said first length multiplied by a constant.

6. The method of claim 1, wherein said first length of said data frame is determined by a total number of bits included in said data frame.

7. The method of claim 1, wherein said physical layer receives said data frame from a first device, and wherein said transport layer provides said data bits included in said data frame to a host communication bus through a host interface.

8. The method of claim 7, wherein said device is an SATA device.

9. A computer device adapter, comprising:

a host interface;

a transport layer interconnected to said host interface layer;

a link layer, wherein said transport layer and said link layer are interconnected by a parallel communication channel having a first width and a first operating frequency; and a physical layer, wherein said link layer and said physical layer are interconnected by a parallel communication channel having a second width and a second operating frequency, wherein said physical layer converts a signal received from said link layer over said parallel communication channel having a second width to a serial data signal having a third operating frequency, wherein said third operating frequency is a integer multiple of said first and second operating frequencies, wherein said first, second and third operating frequencies have an integral relationship to a clock signal, and wherein a frame of data having a first length is passed between said transport layer and said physical layer in a first number of clock signals.

10. The device of claim 9, wherein a clock signal provided to said transport layer has a frequency equal to said first operating frequency, and wherein a clock signal provided to said link layer is equal to said second operating frequency.

11. The device of claim 9, wherein said link layer, and said physical layer do not include a data buffer.

12. The device of claim 9, further comprising:
   a device; and
   a serial communication channel interconnecting said physical layer to said device, wherein said frame of data is passed between said transport layer and said device in said first number of clock cycles plus a number of cycles corresponding to a propagation delay.

13. The device of claim 12, wherein said physical layer and said device communicate over said serial communication channel according to an SATA protocol.

14. The adapter of claim 12, wherein said device is a SATA device.

15. The adapter of claim 14, wherein said SATA device comprises a computer data storage device.

16. The adapter of claim 9, wherein a data buffer is not interposed between said transport layer and said link layer or between said link layer and said physical layer.

17. The adapter of claim 9, wherein said host interface is interconnected to a host computer by a parallel communication channel.

18. A controller apparatus, comprising:
   a serial data channel operating at a first frequency and comprising first and second ends, wherein a frame of data containing a first amount of information is transferred by said serial data channel in a first number of clock cycles;
   a first parallel data channel operating at a second frequency and comprising first and second ends; and
   a physical layer, wherein said physical layer does not include a data buffer, wherein said first end of said first parallel data channel is synchronously interfaced to said second end of said serial data channel by said physical layer, wherein said frame of data containing said first amount of information is transferred by said first parallel data channel in a second number of clock cycles, and wherein a time period between providing a frame of data having said first amount of information to said first end of said serial data channel and receiving said frame of data having said first amount of information at said second end of said first parallel data channel is the same for any frame of data having said first amount of information.

19. The apparatus of claim 18, wherein said first number of clock cycles is an integer multiple of said second number of clock cycles.

20. The apparatus of claim 18, further comprising a data buffer at said second end of said first parallel data channel, wherein said data buffer accommodates differences in the data transfer rates of said first parallel data channel and a second parallel data channel.

21. The apparatus of claim 18, wherein a data transfer rate of said serial data channel is identical to a data transfer rate of said first parallel data channel.

22. A method for interfacing a host computer having a parallel communication bus to a serial device, comprising:
   providing a host interface comprising a parallel interface for passing data to and from said parallel communication bus of said host computer;
   providing transport layer logic interconnected to said host interface by a first parallel communication channel;
   providing link layer logic interconnected to said transport logic by a second parallel communication channel; and
   providing physical layer logic interconnected to said link logic by a third parallel communication channel, and having a serial interface for interconnecting said host computer to said serial device, wherein said second and third parallel communication channels operate synchronously with said serial interface.

23. The method of claim 22, wherein said serial interface operates asynchronously with said parallel communication bus.

24. The method of claim 22, further comprising:
   providing a serial device interconnected to said serial interface by a first serial communication channel, wherein said second and third parallel communication channels operate synchronously with said serial communication channel.

* * * * *